Oct. 30, 1934.   H. A. DREFFEIN   1,978,701
HEAT CONTROL METHOD AND APPARATUS
Filed Nov. 23, 1931   2 Sheets-Sheet 2
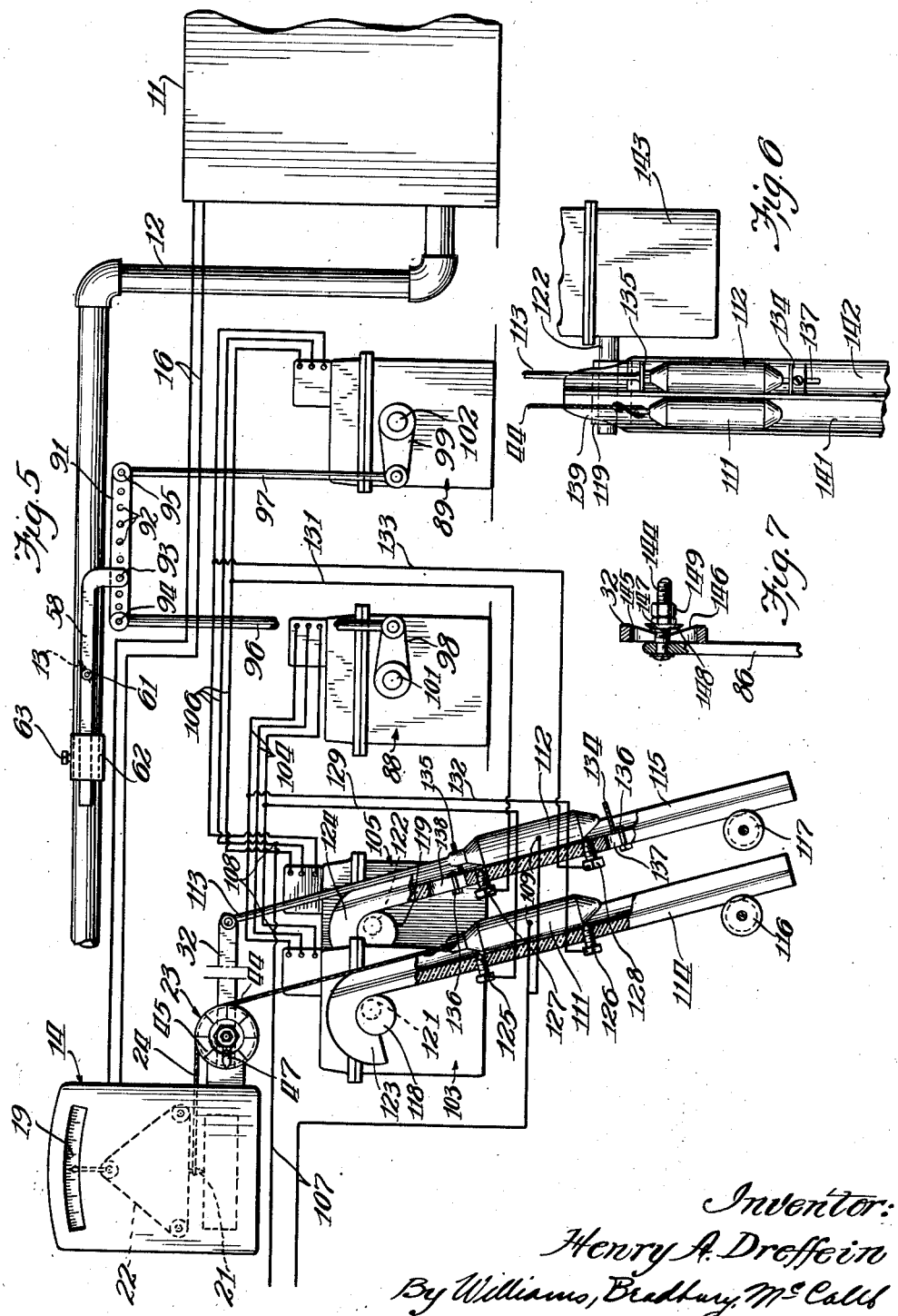
Inventor:
Henry A. Dreffein
By Williams, Bradbury, McCall
& Hinkle. Attys.

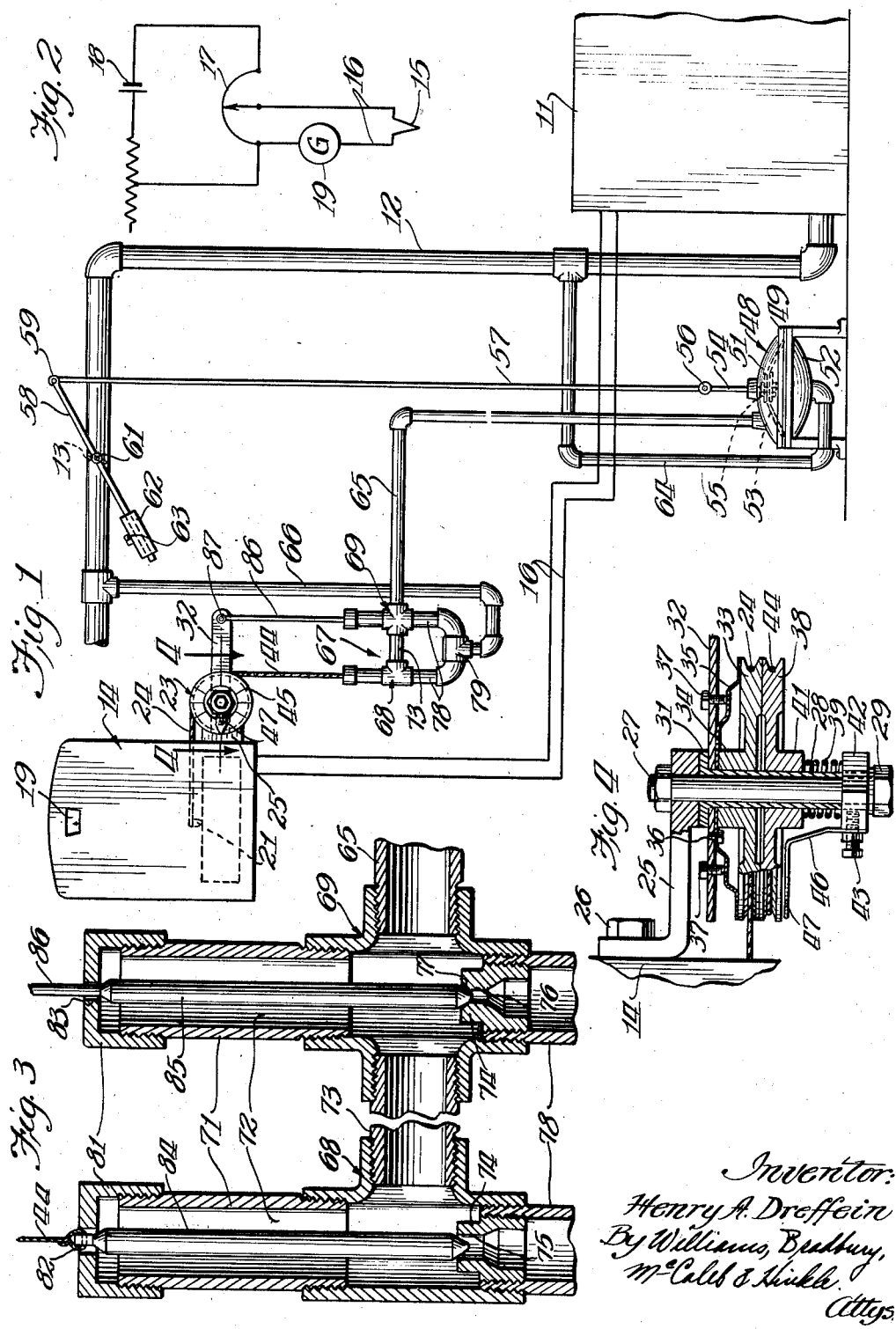

Patented Oct. 30, 1934

1,978,701

UNITED STATES PATENT OFFICE 1,978,701

HEAT CONTROL METHOD AND APPARATUS

Henry A. Dreffein, Chicago, Ill.

Application November 23, 1931, Serial No. 576,737

9 Claims. (Cl. 236—15)

This invention relates in general to furnaces, and has more particular reference to automatic control apparatus and methods for controlling and regulating the temperature within furnaces.

An object of my invention is the provision of an improved control apparatus and method for stabilizing and regulating furnace temperatures.

A further object of the invention is the provision of a novel furnace control which will quickly bring the furnace to a desired temperature and will provide close and automatic regulation without appreciable over-riding of the temperature or over- or under-heating of the furnace or articles therein.

Another object of the invention is the provision of co-acting control means which, responsive to furnace temperatures, will cause the actuation of a valve operating means whereby the rate of fuel flow to the furnace is so varied as to produce desired temperatures in the furnace.

Other objects and advantages of the invention will be apparent from the following description, and from the accompanying drawings, in which similar characters of reference indicate similar parts throughout the several views.

In the drawings:

Fig. 1 diagrammatically shows a furnace equipped with a novel control embodying the features of my invention;

Fig. 2 is a schematic wiring diagram of a temperature responsive device adaptable for use in my novel control;

Fig. 3 is an enlarged cross-section taken substantially on the line 3—3 of Fig. 1;

Fig. 4 is a cross-section taken substantially on the line 4—4 of Fig. 1;

Fig. 5 is a view similar to Fig. 1 and illustrative of another embodiment of my invention;

Fig. 6 is a partial side view of a temperature responsive actuating means for the control shown in Fig. 5; and Fig. 7 is a sectional detail of a portion of my novel control.

The automatic control and regulation of the temperature in a furnace 11 (see Figs. 1 and 5) is particularly desirable in metallurgical processes and other processes involving the heat treatment of materials, wherein known manual and signal controls are subject to inaccuracies resulting in loss or impairment of materials due to over- or under-heating. It is, moreover, exceedingly difficult and tedious to vary the rate of fuel flow to a furnace so as to obtain just the desired temperatures without varying the rate of fuel flow too much one way or the other and either wasting fuel and damaging the materials by over-heating or under-heating the materials.

In the instant invention, the rate of fuel and/or air supplied to the furnace 11 by a fuel and/or air supply main or pipe 12 is determined by a control valve 13 in the pipe 12, which is controlled in response to the temperatures in the furnace 11 by a suitable temperature responsive device or pyrometer 14. The pyrometer 14 controls the valve 13 through valve actuating means operably connected to the pyrometer and to valve operating means connected to the valve for varying the rate of fuel and/or air supply of the furnace in response to temperature variations therein as the furnace temperature approaches a desired value.

While a detailed description of the pyrometer 14 is unnecessary to a complete understanding of the invention, it might be well to point out by way of explanation that such pyrometers usually include, as shown schematically in Fig. 2, a thermocouple 15 adapted to be mounted in the furnace and supplying electrical potentials proportional to the temperatures in the furnace to leads or conductors 16. These electrical potentials from the thermocouple are compared with known potentials of opposite polarity obtainable from a voltage divider 17, connected across a battery 18, by means of a galvanometer 19. When the voltage divider 17 calibrated in terms of temperature, is set for a given temperature and the galvanometer 19 is balanced, the pyrometer measures the actual temperature indicated by the voltage divider.

Such pyrometers usually include an indicator 21, as shown in Figs. 1 and 5, which is movable in response to variations in furnace temperature. This member or indicator 21 may, as diagrammatically illustrated in Fig. 5, be driven from the galvanometer 19 by, for example, a pulley and belt system 22. I employ this feature of the pyrometer 14 to control my valve operating means and actuating means therefor responsive to variations in furnace temperatures and to counteract such temperature variations by means of rotatable or rockable translating means 23 connected to and driven by the indicator 21 through a cable connection 24.

This translating means 23 is identical in the two embodiments shown in Figs. 1 and 5, and comprises a mounting bracket 25 (see Fig. 4) secured by bolts or screws 26 to the pyrometer housing and carrying at its free end a stub shaft or bolt 27. A spindle or bearing 28 is carried between the end of the bracket 25 and a head or enlarged portion 29 of the bolt or shaft 27 and this spindle has a collar or flange 31 adjacent the bracket 25 to separate or space an arm or lever 32 rockable on the spindle from the bracket.

A pulley or sheave 33 carried on the spindle 28 adjacent the arm 32 is rotatably or oscillatably driven by the indicator 21 and the cable connection 24 which is suitably secured to the pulley. This pulley 33 is separated from the arm 32 by its hub 34 and is frictionally and drivingly connectable with the arm 32 by means of a resilient or yieldable member 35 carried on the spindle 28 between the pulley hub 34 and the arm 32 and secured to the arm by a retaining screw 36. Adjustable means or set screws 37 carried by the arm 32 adjustably press the resilient member 35 into frictional engagement with the pulley 33.

Another pulley or sheave 38 is carried on the spindle 28 adjacent the pulley 33 and is pressed into frictional engagement therewith by a coil spring 39 extending on the spindle 28 between the hub 41 of the pulley 38 and a collar 42 slidably fixed on the spindle by a set screw 43. The pulley 38 has secured thereto a cable connection 44 for transmitting motion to actuating means for the valve operating means responsive to furnace temperatures, as will be more fully described presently. This pulley 38 is calibrated about its periphery as shown at 45 in Figs. 1 and 5, in terms of temperature and cooperates with a pointer 46 carried on the collar 42 by the set screw 43 and having an indicator position 47 for registering with the temperature calibrations 45 on the pulley 38.

As already mentioned the translating means 23 under the influence of the indicator 21 controls, in response to furnace temperatures, the operation of the control valve 13 whereby the rate of flow of fuel and/or air to the furnace 11 is so varied as to counteract temperature fluctuations in the furnace and to prevent over- or under-heating of materials in the furnace. To this end, I provide, as shown in Fig. 1, valve operating means generally indicated by the reference character 48 for controlling the valve 13 and hence the rate of flow of fuel to the furnace 11. In this instance the valve operating means 48 is a pressure responsive or diaphragm motor having a housing or casing 49 divided into an upper chamber 51 and a lower chamber 52 by a movable member or diaphragm 53.

The diaphragm 53 is linked or connected to the valve 13 by a rod 54 fixed at one end to the diaphragm as shown at 55 and extending outside of the housing 49 to a pivotal connection 56 with a link or rod 57, and by a valve arm 58 having an end 59 pivoted to the link 57 and fixed intermediate its ends to the valve stem 61 for operating the valve 13 upon movement of the diaphragm 53. At the end opposite the pivoted end 59, the valve arm 58 carries a slidable weight 62 slidably secured thereto by a set screw 63 for counterbalancing the linkage or connections between the valve 13 and the valve operating means 48.

Pressure for actuating the pressure responsive or diaphragm motor whereby to operate the fuel control valve 13 and to c ntrol the rate of flow to the furnace 11 is obtained from the fuel and/or air supply pipe 12 which is connected by pipe fittings 64 to the lower chamber 52. The fitting 64 provides communication between the pipe 12 at the furnace side of the valve 13 and the chamber 52 for supplying pressure against the under side of the diaphragm 53, tending to close the valve 13. The upper chamber 51 is supplied with a variable pressure from the supply side of the valve 13 in the supply pipe 12 by pipe fittings 65 communicating with the upper chamber and pipe fittings 66 communicating with the pipe 12 at the supply side of the valve 13 and connected to the fittings 65 by a temperature responsive pressure control 67. The pressure control 67 serves to vary the pressure in the chamber 51, tending to open the valve 13 or to permit the pressure in the chamber 52 to move the valve 13 toward its closed position.

The pressure control 67 comprises co-acting valves 68 and 69 rapidly acting to change the rate of fuel flow in the pipe 12 and more slowly acting to change such rate of flow, respectively, by correspondingly varying the pressure supplied to the upper side of the diaphragm 53 or to the chamber 51 from the pipe 12, and thus counteracts or impedes the variation in furnace temperature actuating the control 67, gradually bringing the temperature to a desired value.

The valves 68 and 69, as shown more particularly in Fig. 3, include elongated or tubular casings 71 forming valve chambers 72 communicating in tandem or series with the pipe 65 by means of a connection 73 between the valve chambers 72. These chambers 72 terminate at one end thereof at fittings or internal flanges 74 which are formed to provide a valve port 75 in the valve 68, and a valve port 76 and a valve seat 77 in the valve 69. The valve ports 75 and 76 communicate at one side with the respective chamber 72 and at the opposite side are connected by suitable fittings 78 into opposite arms of a T fitting 79 having its other arm connected to the pipe 66 for supplying pressure from the pipe 12 through either or both of the valves 68 and 69 by way of the connections 65 and 73 to the upper chamber 51 to actuate the diaphragm operated valve 13.

Caps or covers 81 close the casings 71 at the end opposite the valve ports 75 and 76 and are provided with perforations 82 and 83 serving to permit actuating connections for reciprocable valve plungers or stems 84 and 85 to enter the chambers 72, and serving as bleed or leak apertures for the valves 68 and 69, respectively.

The valve plunger 84 is fixed or attached to the cable connection 44 driven from the temperature responsive rotatable means 23 and is adapted to be reciprocated thereby from a position at which the plunger 84 projects through the bleed or leak aperture 82 to a position at which the plunger 84 projects through the valve port 75. The valve plunger 85, on the other hand, has a relatively short throw extending from a closed position of the bleed or leak aperture 83 to a closed position against the valve seat 77. The plunger 85 is reciprocable between these positions responsive to furnace temperatures by the arm 32 to which the plunger is connected by a link or reduced portion 86 having a connection 87 with the arm 32. The pressure received by the chamber 51 from the pipes 12, 65, and 66 depends upon the relative effective openings of the bleed or leak apertures 82 and 83 and of the valve ports 75 and 76, and this relative effective opening is controlled by the temperature responsive valve plungers 84 and 85.

In operation as the temperature in the furnace varies or differs from a desired temperature, the indicator 21, in moving accordingly, rotates or rocks the arm 32 and the pulley 38, both frictionally driven by the pulley 33. In view of the greater radius of rotation the arm 32 tends to produce a greater movement of the plunger 85 for a given movement of the indicator 21 than does the pulley 33 acting on the plunger 84, thus producing a quickly acting valve that quickly changes the pressure in the chamber 51 for adjusting the valve 13 and hence the rate of fuel and/or air supplied to the furnace so as to counteract or impede further variation of the temperature in the furnace, and a more slowly acting valve further impeding temperature variation in the furnace and slowly bringing the temperature to a desired value.

The latter valve is operating all the while as the former valve operates, and may continue to operate after the yieldable or friction member 35 begins to slip due to the plunger 85 seating either on the seat 77 or in the bleed or leak aperture 83, thereby preventing further rotation or rocking of the arm 32 by the drive pulley 33, and until the indicator 21 responsive to furnace temperatures reverses its direction. When the indicator 21 reverses its direction, the drive pulley 33 rotates or rocks the pulley 38 and the arm 32 in the opposite direction, the valve 69 acting quickly to impede the variation in temperature by quickly varying the position of the valve 13 to produce such a result, and the valve 68 slowly impeding or bringing the furnace temperature to a desired value by slowly varying the position of the valve 13 to produce such a result without over-riding the desired temperature. Thus the valves 68 and 69 are independently and collectively operable in response to furnace temperature variations.

The indicating portion 47 of the pointer 46 and the temperature calibrations 45 indicate the desired temperature which may be set or varied by holding the drive pulley 33 and rotating the pulley 38 until the pointer registers with the desired temperature shown on the pulley 38. This setting or varying of the desired temperature adjusts the position of the valve plunger 84 in respect of the valve port 75 and the bleed aperture 82, thereby varying the relative leak opening and pressure supply opening of the valves 68 and 69 and correspondingly changing the pressure supplied to the diaphragm operating the fuel control valve 13. In this manner the valve 13 is operated as a fuel and/or air throttle which serves to counteract and impede furnace temperature variations and to bring the temperature in the furnace to a desired value without appreciably over-riding or going beyond the desired or set temperature.

I may accomplish the foregoing results and advantages electrically as illustrated in Fig. 5, wherein the counter-balanced valve arm 58 is differentially influenced by a pair of reversible electrical motors or damper controllers 88 and 89 linked or connected thereto by a singletree or arm 91 having a plurality of pivotal positions 92 intermediate the ends of the arm for making a pivotal connection 93 with the counter-balanced arm 58. The ends of this arm 91 have pivotal connections 94 and 95 with rods or arms 96 and 97 pivoted to cranks or levers 98 and 99 rockable by the shafts 101 and 102 of the motors 88 and 89, respectively.

The coacting control means for actuating the valve operating motors 88 and 89 in this instance comprise a reversible motor or damper controller 103 connected in parallel to the motor 88 by conductors 104 and another reversible motor or damper controller 105 connected in parallel to the motor 89 by conductors 106. These motors 88, 89, 103, and 105 usually have a constant maximum throw in either direction determined by an automatic switch assembled in the motor housing, and are supplied with electrical energy from a line 107 connected as at 108 to each pair of parallel connected motors and as at 109 to each of two temperature responsive, reciprocable plungers or contactors 111 and 112. The contactor 111 is fixed to the cable connector 44 and is thereby reciprocable by the pulley 38 driven by the pulley 33, and the contactor 112 is fixed to one end of a connector 113 having its other end fixed to the arm 32 whereby the latter contactor is reciprocable when the arm 32 is driven by the pulley 33.

These reciprocable contactors 111 and 112 are guidably carried in channel or trough-shaped members 114 and 115, respectively, which are in turn reciprocably supported on idler rolls 116 and 117 and eccentrics or cams 118 and 119 fixed on shafts 121 and 122 of motors 103 and 105. Cam follower portions 123 and 124 of the channel members 114 and 115 engage the cams 118 and 119, respectively, to permit reciprocating the channel members and hence spaced contacts 125 and 126 carried by the channel member 114 and spaced contacts 127 and 128 carried by the channel member 115.

The contacts 125 and 127 are connected by conductors 129 and 131 to corresponding sides of each pair of parallel connected motors whereby upon contact with the reciprocable contactors 111 and 112 the motors will operate in one direction while upon contact between the reciprocable contactors 111 and 112 and contacts 126 and 128 connected by conductors 132 and 133 to the opposite corresponding sides of each pair of parallel connected motors, the motors will operate in the opposite direction.

The contactor 112, like the valve plunger 85, has a limited throw by virtue of brackets 134 and 135 adjustably secured at each end of the contactor by means of bolt and nut assemblies 136 and slots 137 and 138 in the channel member 115 through which the bolts pass. The brackets 134 and 135 provide adjustable stops for the contactor 112.

As shown in Fig. 6, the channel members 114 and 115 may be combined into a single reciprocable member 139 having adjacent grooves or channels 141 and 142 slidably carrying the contactors 111 and 112, respectively. In such a construction a single motor 143 reciprocates the member 139 and is connected in parallel with the motor 88, the contactor 112 controlling only the motor 89.

When the contactors 111 and 112 are raised responsive to a call for more heat in the furnace 11, the contactor 112 makes contact with the contact 127 starting the motor 89 or the motors 89 and 105 first, by virtue of the length of the arm 32, and thereafter the contactor 111 makes contact with the contact 125 starting the motors 88 and 103. This initial operation of the motor 89 moves the arm 91 downwardly about the pivotal connection 94, opening the valve 13 to supply fuel and/or air at a greater rate to the furnace, whereby to meet the call for more heat. At the same time the channel member 115 and hence the contact 127 is being moved upwardly by cam 119 driven by the motor 105 and is tending to break the contact between the contactor and the contact 127 whereby to stop the motors. This initial movement of the valve 13 tends to counteract or impede the variation in furnace temperature.

Meanwhile if the call for more heat continues, the contactor 111 contacts with the contactor 125, starting the motors 88 and 103, or 143 and 103, and gradually moving the valve 13 toward the position for supplying the fuel at the proper rate to meet the call for more heat. This operation of the motor 88 affects the operation or movement of the valve 13 more than the operation of the motor 89 due to the location of the pivotal connection 93 nearer to the pivot 94 than to the pivot 95. At the same time, however, the contact 125 is being moved upwardly under the action of the cam 118 and the cam follower 123 tending to break the contact whereby to stop the motors.

When the call for more heat ceases, the upward movement of the contactors 111 and 112 ceases, and the indicator 21 may then reverse its direction or over-ride the desired temperature causing the contactors to make contact with the contacts 126 and 128 to reverse the motors 88 and 89 and to close the valve 13 a relatively small amount by the initial operation of the motor 89 and to continue to close the valve 13 by the subsequent starting of the motor 88 whereby to impede the variation in furnace temperature and bring it to a desired value.

The connection 87 may be adjustable, as shown in Fig. 7, so that upon a desired or variable movement of the indicator 21 or change in temperature, the arm 32 begins to operate the quickly acting valve 69 or the contactor 112. To provide such an adjustable connection, the link or reduced portion 86 or 113 is slidably attached to the arm 32 by a bolt 144 passing through a slot 145 in the end of the arm 32. The end of the arm 32 is provided with a concave or inclined surface 146 at the side opposite the link 86, and a nut 147 is provided with a convex or oppositely inclined surface 148. The nut 147 is adjustably threaded on the bolt 144 and may be locked in any adjusted position by a lock-nut 149.

It will be noted that by my novel control apparatus and method, the furnace temperature when varied, actuates in response thereto a valve operating means which first varies the rate of fuel and/or air supply of the furnace so as to check or impede the change in temperature and thereafter so as to counteract the change in temperature and bring or restore it to a desired value. In this manner inaccuracies due to the human element and appreciable over- or underheating of materials are avoided, and close regulation is obtained.

Having thus described my invention, what I claim as new and desire to secure by Letters Patent of the United States, is:

1. In a furnace temperature control system, a fuel supply valve having an arm connected thereto, a rockable member having a plurality of alternate positions for pivotally connecting said arm to said rockable member, and valve operating means connected to said member at opposite sides of said alternate positions for moving said member immediately upon a change in furnace temperature, and continuing to move said rockable member upon a continuance of the change in temperature whereby to adjust said valve and to counteract the temperature change.

2. In a temperature responsive furnace fuel control, a fuel supply valve, a pair of electrical motors differentially connected therewith for the operation thereof, another electrical motor, reciprocable motor starting contacts operably connected to the last said motor, and a plurality of temperature responsive contactors associated with said motor starting contacts for selectively and collectively controlling said pair of motors differentially connected to said fuel valve.

3. In a temperature responsive furnace fuel control, a fuel supply valve, pressure responsive means operably connected therewith, a pair of valves controlling the pressure of said pressure responsive means, each having spaced ports, a reciprocable plunger for each said valve for opening and closing said ports, rotatable means connected to said plungers for the reciprocation thereof, and temperature responsive means drivingly connected with said rotatable means for reciprocating said plungers, whereby to control the pressure of said pressure responsive means.

4. A temperature responsive fuel control for furnaces, comprising a fuel supply control valve, valve operating means for causing an initial and a further operation of said valve, including a plurality of reciprocable elements, a said reciprocable element having a shorter throw than another said reciprocable element, a rockable device for reciprocating said reciprocable element having said shorter throw, another rockable device for reciprocating said other reciprocable element, the first said rockable device being adapted to move said reciprocable element associated therewith a greater distance during the same time than said other rockable device moves the reciprocable element associated therewith, common actuating means for said rockable device having driving engagement with said rockable device for said reciprocable element having said shorter throw during the entire throw of said reciprocable element and having sliding engagement with the said rockable device beyond said shorter throw, and temperature responsive means for operating said common actuating means.

5. A temperature responsive fuel control comprising a fuel supply control valve, valve operating means for causing an initial and a continued operation of said valve, including a plurality of reciprocable elements, a said reciprocable element having a shorter throw than another said reciprocable element, a rockable device for each said reciprocable element, common actuating means for said rockable devices having driving engagement with said rockable device for said reciprocable element having said shorter throw during the entire throw of said reciprocable element and having sliding engagement with the said rockable device beyond said shorter throw, and temperature responsive means for operating said common actuating means.

6. A temperature responsive fuel control comprising a fuel supply control valve, valve operating means for causing an initial and a further operation of said valve, including a pair of reciprocable elements, a rockable device for reciprocating one of said elements, another rockable device for reciprocating the other said element, the first said rockable device being adapted to move said reciprocable element associated therewith a greater distance than said other rockable device during the same time said other rockable device moves the reciprocable element associated therewith, common actuating means for said rockable devices, and temperature responsive means for operating said common actuating means.

7. In a furnace having a fuel supply control valve and valve operating means, a controller for causing an initial variation in and further control of the fuel supply, comprising a pair of rotatable members operably connected to said valve operating means at unequal radii, and common rotatable means for operating said rotatable members.

8. In a furnace having a fuel supply control valve and valve operating means, a controller for causing an initial and continued variation in the fuel supply, comprising a rotatable member having a connection with said valve operating means, another rotatable member concentrically arranged with the first said rotatable member and having a connection with said valve operating means at a greater distance from the center of rotation than the first said connection, and driven means between said rotatable members having driving engagement with both said members.

9. In a furnace having a fuel supply control valve and valve operating means, a controller for causing an initial and continued variation in the fuel supply, comprising a rotatable member having a connection with said valve operating means, another rotatable member concentrically arranged with the first said rotatable member and having a connection with said valve operating means at a greater distance from the center of rotation than the first said connection, and driven means between said rotatable members having driving engagement with one of said members and having driving and slidable engagement with the other of said members.

HENRY A. DREFFEIN.